(12) United States Patent
Howson

(10) Patent No.: US 9,299,187 B2
(45) Date of Patent: Mar. 29, 2016

(54) OPACITY TESTING FOR PROCESSING PRIMITIVES IN A 3D GRAPHICS PROCESSING SYSTEM

(71) Applicant: Imagination Technologies Limited, Kings Langley (GB)

(72) Inventor: John Howson, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

(21) Appl. No.: 14/615,580

(22) Filed: Feb. 6, 2015

(65) Prior Publication Data

US 2015/0221127 A1 Aug. 6, 2015

(30) Foreign Application Priority Data

Feb. 6, 2014 (GB) .................................. 1402037.4

(51) Int. Cl.
*G06T 15/40* (2011.01)
*G06T 15/00* (2011.01)
*G06T 15/04* (2011.01)
*G06T 15/80* (2011.01)

(52) U.S. Cl.
CPC ............. *G06T 15/405* (2013.01); *G06T 15/005* (2013.01); *G06T 15/04* (2013.01); *G06T 15/40* (2013.01); *G06T 15/80* (2013.01); *G06T 2210/62* (2013.01)

(58) Field of Classification Search
None
See application file for complete search history.

(56) References Cited

U.S. PATENT DOCUMENTS

| 6,271,848 B1 | 8/2001 | Yasui et al. |
| 6,697,063 B1 | 2/2004 | Zhu |
| 2005/0017970 A1* | 1/2005 | Howson ................. G06T 15/40 345/421 |
| 2013/0229414 A1* | 9/2013 | Gruber .................... G06T 15/40 345/426 |

FOREIGN PATENT DOCUMENTS

GB 2359230 A 8/2001

* cited by examiner

*Primary Examiner* — Peter Hoang
(74) *Attorney, Agent, or Firm* — Vorys, Sater, Seymour and Pease LLP; Vincent M DeLuca

(57) ABSTRACT

Non-opaque primitives (e.g. translucent or punch-through primitives) often include some fragments which do not need to be treated as non-opaque fragments. For example, some fragments of a translucent primitive may be entirely opaque or entirely transparent. However, typically, the opacity states (e.g. alpha states) of the fragments are not known until texturing has been applied because it is the texture that includes the opacity information (e.g. the alpha values). However, as described herein, an opacity test is performed up front (e.g. before texturing is applied to fragments of a non-opaque primitive) to see if the processing of the fragments can be simplified. For example, if fragments are fully transparent then they may be discarded. As another example, if fragments are fully opaque then they may be handled as if they have an opaque object type such that the subsequent processing of the fragments is simplified.

24 Claims, 7 Drawing Sheets

OPACITY TESTING FOR PROCESSING PRIMITIVES IN A 3D GRAPHICS PROCESSING SYSTEM

BACKGROUND

Three dimensional (3D) graphics processing systems are used to generate images representing views of a 3D scene, e.g. for use in a computer game or other application running on a computer. Modern 3D rendering techniques allow fragments from multiple primitives to be combined in a number of different manners. The type of combining is typically dictated by the type of fragment, which can for example be opaque, translucent or punch through. As a matter of terminology, a "fragment" is an element of a primitive at a sample position. In some examples, a single sample position may correspond to a pixel position of the final rendered image, but in other examples, more than one (e.g. four) sample positions may correspond to each pixel position. A depth buffer can be used to store depth values for an array of sample positions to indicate the current depth at each sample position. A depth test can be performed for incoming fragments with reference to the depth buffer to determine if the fragments are hidden by previously processed fragments. If the incoming fragments are not hidden then the appropriate depth values in the depth buffer can be updated to reflect the depth of the incoming fragments. Opaque fragments are combined by overwriting any previously written fragments. Translucent fragments are processed such that a new translucent fragment value is combined with a previous fragment value using a blending equation that is indicated by the application.

Typically the blending equation uses an alpha value that is sourced from a texture in order to determine how transparent the fragment is. Punch through fragments are processed by performing a test that indicates whether a fragment is "present" i.e. is part of the primitive, or not. If a fragment is determined to not be present then no combining is performed with previously written fragments and, in addition, no depth is written to the depth buffer for that fragment. Typically the punch through test is performed against an alpha value that is sourced from a texture. Punch through/alpha testing may be combined with opaque or translucency blending to produce opaque punch through and translucent punch through fragment types. In the case of punch through and translucency it should be noted that as each case effectively combines a new fragment value with a previous value it is important that the order in which primitives are submitted is preserved.

For purposes of clarity the above types of processing will be referred to as "object types" of opaque, translucent, opaque punch through and translucent punch through. The translucent, and both punch through object types may be referred to herein as "non-opaque object types". As can be appreciated, the processing of primitives with non-opaque object types is generally more complex than the processing of primitives with an opaque object type.

Some 3D graphics processing systems are tile based rendering systems. These systems have a rendering space which is divided into a plurality of rectangular blocks or tiles. The way in which rendering is performed in these systems is described with reference to a tile based deferred rendering system shown schematically in FIG. 8. This shows a geometry processing unit 802, which receives the image data from an application and transforms it into screen space using well-known methods. The data is then supplied to a tiling unit 804, which inserts the screen space geometry into object lists for a set of defined rectangular regions, or tiles, 806. Each list contains primitives that exist wholly or partially in a sub-region of a screen (i.e. a tile). A list exists for every tile on the screen, although it should be borne in mind that some lists may have no data in them.

The tile lists are then passed tile by tile to a hidden surface removal unit 808 (HSR) and from there to a texturing and shading unit 810 (TSU). The HSR unit 808 performs depth tests on fragments of the primitives in the tile (with reference to a depth buffer as mentioned above) and passes to the TSU 810 only data about fragments which pass the depth test.

An image typically comprises a mixture of opaque, translucent and punch through primitive object types. In order to correctly render such an image, the HSR unit 808 must pass "layers" of fragments which need to be processed to the TSU 810. This is because more than one fragment can contribute to the image data to be applied to a particular sample position. For example the view from the inside of a building looking through a pane of dirty glass requires both the geometry visible through the glass, and then the pane of glass itself to be passed to the TSU 810. This process is referred to as "pass spawning".

Tags are identifiers which associate a fragment with the primitive of which it is a part, and which allow attributes such as texturing and shading data for the primitive to be fetched when required. Typically, a tile based deferred rendering device of the type shown in FIG. 8 will use a tag buffer at the interface between HSR unit 808 and TSU 810, to hold tags for fragments from the front most primitives (i.e. those which pass the depth test) for each sample position in the tile currently being processed. Tags for opaque fragments which pass the depth tests are typically written into such a tag buffer even if they overwrite an existing tag as that corresponds to the correct operation to combine opaque fragments, as described above. Fragments from translucent and punch through primitives may need to be combined with fragments that they overdraw. The combining of these fragments must be performed in the order that they were submitted by the application.

As such, the HSR unit 808 must flush currently visible tags to the TSU 810 whenever translucent or punch through fragments are found to lie in front of fragments currently stored within the tag buffer, i.e. a pass must be spawned. This results in all currently visible tags stored in the tag buffer being flushed to the TSU 810. In the case of punch through fragments, the validity of fragments, and hence whether their depth values should be updated in the depth buffer, can only be determined by the TSU 810. Therefore, tags for punch through primitives must also be flushed directly after any tags currently stored within the tag buffer have been flushed. It is noted that the combination of a tag and a position in the tag buffer defines a fragment, so the flushing of tags from the tag buffer can be considered to be flushing fragments from the tag buffer. Conceptually, it makes sense to consider fragments being stored in the tag buffer and fragments being flushed out to the texturing and shading unit. In a practical implementation, this conceptual flow of fragments is embodied by storing tags in the tag buffer and flushing tags from the tag buffer.

The graphics data that applications feed into graphics processing systems gets more complex as the user demands and expectations on the applications increase. In particular, the complexity of texturing and shading is increasing, and the use of non-opaque object types is getting more prevalent. This may be problematic since, as described above, the processing of primitives with non-opaque object types is more complicated than the processing of primitives with opaque object types.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

It has been realised that translucent and punch-through primitives, which have a non-opaque object type, often include some fragments which do not need to be treated as fragments having non-opaque types. For example, some fragments of a translucent or punch-through primitive may be entirely opaque or entirely transparent. In the graphics processing systems described above, the opacity of the fragments of a translucent or punch-through primitive are not known until texturing has been applied because it is the texture that includes the translucency information (e.g. the alpha values) to be applied to the fragments. Given the necessity to flush overlapped fragments prior to passing the translucent or punch through fragments to the TSU in the graphics processing systems described above, it is apparent that there will be many cases where a flush need not have been performed. For example where the overdrawing fragments were either fully transparent (and hence there is no overdraw) or fully opaque (and hence could overwrite the contents of the tag buffer without flushing).

However, in examples described herein, an opacity test is performed up front (e.g. before texturing is applied to fragments of a translucent or punch-through primitive) to see if further processing of the fragments can be avoided or simplified. For example, if fragments of a punch-through primitive are fully transparent then they may be discarded and if fragments of a translucent primitive are fully transparent then flags can be set to indicate that the fragments are not to be transmitted for subsequent texturing. For example, if fragments of a translucent primitive are fully transparent then 'tag write disable' flags can be set which means that the tags of the translucent primitive are not written into the tag buffer and therefore will not cause the flushing of underlying tags to the texturing and shading unit. As another example, if fragments are fully opaque then the fragments may be handled as if they had an opaque object type such that their tags may overwrite current tags in the tag buffer without causing a flush.

There is provided a method of processing a primitive in a 3D graphics processing system to apply depth testing and texturing to the primitive, wherein the primitive has a non-opaque object type, and wherein the texturing comprises texturing fragments of the primitive in accordance with the object type associated with the fragments, the method comprising: receiving fragments of the primitive to be processed, the received fragments of the primitive being associated with said non-opaque object type; prior to applying texturing to received fragments of the primitive: (i) obtaining an opacity state map which provides indications of the opacity of texels of a texture that is to be applied to the primitive; (ii) for each of a plurality of blocks of one or more fragments of the primitive, using the opacity state map to determine a respective opacity state for the fragment block by: (a) determining the position of a block of opacity states within the opacity state map for the fragment block based on the texture co-ordinates of one or more fragments of the fragment block, and (b) performing a conservative combination of the opacity states of the opacity state block to determine the opacity state for the fragment block; and (iii) using the determined opacity states for the fragment blocks to simplify the processing of the fragments of the primitive by performing one or more of: (a) based on the determined opacity states, indicating that the fragments of one or more of the fragment blocks are to be associated with a different object type to said non-opaque object type for subsequent processing of the fragments, (b) discarding one or more of the fragment blocks based on the determined opacity states, and (c) based on the determined opacity states, setting one or more flags to indicate that the fragments of one or more of the fragment blocks are not to be transmitted for subsequent texturing; applying depth testing to fragments of the primitive; and subsequent to said simplification, applying texturing to fragments of the primitive in accordance with their associated object types.

Steps (i) to (iii) may be performed prior to applying depth testing to the fragments of the primitive, and the depth testing may be applied to fragments of the primitive subsequent to said simplification and in accordance with their associated object types.

There is provided a method of generating an opacity state map comprising a plurality of opacity states for use in processing a primitive in a 3D graphics processing system, wherein each of the opacity states of the opacity state map indicates the opacity of a texel block of one or more texels of a texture and wherein each of the opacity states indicates that the corresponding texel block of one or more texels is: (i) fully transparent, (ii) fully opaque, or (iii) neither fully transparent nor fully opaque, the method comprising: receiving opacity values for texels of the texture; determining the opacity states of the opacity state map based on the received opacity values in a conservative manner such that: (i) an opacity state is determined to indicate that a corresponding texel block of one or more texels is fully transparent only if the opacity values of the texture indicate that all of the one or more texels in the texel block are transparent, and (ii) an opacity state is determined to indicate that a corresponding texel block of one or more texels is fully opaque only if the opacity values of the texture indicate that all of the one or more texels in the texel block are opaque; and storing the opacity state map for subsequent use in a method of processing a primitive in a 3D graphics processing system; wherein the opacity states are determined in a manner such that a block of opacity states within the opacity state map is to be used to determine an opacity state for a block of one or more fragments by performing a conservative combination of the opacity states of the opacity state block.

There is provided a 3D graphics processing system configured to process a primitive by applying depth testing and texturing to the primitive, wherein the primitive has a non-opaque object type, the system comprising: a depth testing module configured to apply depth testing to fragments of the primitive; a texturing module configured to apply texturing to fragments of the primitive in accordance with the object type associated with the fragments; and an opacity testing module arranged to operate on fragments of the primitive prior to texturing of the fragments by the texturing module, the opacity testing module being configured to: (i) obtain an opacity state map which provides indications of the opacity of texels of a texture that is to be applied to the primitive; (ii) for each of a plurality of blocks of one or more fragments of the primitive, use the opacity state map to determine a respective opacity state for the fragment block by: (a) determining the position of a block of opacity states within the opacity state map for the fragment block based on the texture co-ordinates of one or more fragments of the fragment block, and (b) performing a conservative combination of the opacity states of the opacity state block to determine the opacity state for the fragment block; and (iii) use the determined opacity states for the fragment blocks to simplify the processing of the fragments of the primitive by performing one or more of: (a) based on the determined opacity states, indicating that the fragments of one or more of the fragment blocks are to be associated with a different object type to said non-opaque object type for subsequent processing of the fragments, (b) discarding one or more of the fragment blocks based on the determined opacity states, and (c) based on the determined opacity states, setting one or more flags to indicate that the fragments of one or more of the fragment blocks are not to be transmitted to the texturing module for subsequent texturing; wherein the texturing module is configured to apply texturing to fragments of the primitive in accordance with their associated object types subsequent to said simplification.

There is provided a 3D graphics processing system configured to generate an opacity state map comprising a plurality of opacity states for use in processing a primitive, wherein each of the opacity states of the opacity state map indicates the opacity of a texel block of one or more texels of a texture and wherein each of the opacity states indicates that the corresponding texel block of one or more texels is: (i) fully transparent, (ii) fully opaque, or (iii) neither fully transparent nor fully opaque, the system comprising: an input for receiving opacity values for texels of the texture; an opacity state determination module configured to determine the opacity states of the opacity state map based on the received opacity values in a conservative manner such that: (i) an opacity state is determined to indicate that a corresponding texel block of one or more texels is fully transparent only if the opacity values of the texture indicate that all of the one or more texels in the texel block are transparent, and (ii) an opacity state is determined to indicate that a corresponding texel block of one or more texels is fully opaque only if the opacity values of the texture indicate that all of the one or more texels in the texel block are opaque; and wherein the opacity state determination module is further configured to send the determined opacity state map to a store for storage therein, the determined opacity state map being for subsequent use in a method of processing a primitive in the 3D graphics processing system; wherein the opacity state determination module is configured to determine the opacity states in a manner such that a block of opacity states within the opacity state map is to be used to determine an opacity state for a block of one or more fragments by performing a conservative combination of the opacity states of the opacity state block.

There is provided a method of processing a primitive in a 3D graphics processing system to apply depth testing and texturing to the primitive, wherein the primitive has a non-opaque object type, the method comprising: receiving fragments of the primitive to be processed; prior to applying depth testing and prior to applying texturing to received fragments of the primitive: (i) obtaining an opacity state map which provides indications of the opacity of texels of a texture that is to be applied to the primitive; and (ii) for each of a plurality of blocks of one or more fragments of the primitive, using the opacity state map to determine a respective opacity state for the fragment block by: (a) determining the position of a block of opacity states within the opacity state map for the fragment block based on the texture co-ordinates of one or more fragments of the fragment block, and (b) performing a conservative combination of the opacity states of the opacity state block to determine the opacity state for the fragment block; and processing fragments of the fragment blocks in accordance with the respective determined opacity states of the fragment blocks to thereby apply depth testing and texturing to fragments of the primitive.

There is provided a 3D graphics processing system configured to process a primitive by applying depth testing and texturing to the primitive, wherein the primitive has a non-opaque object type, the system comprising: a depth testing module configured to apply depth testing to fragments of the primitive; a texturing module configured to apply texturing to fragments of the primitive; and an opacity testing module arranged to operate on fragments of the primitive prior to depth testing of the fragments by the depth testing module and prior to texturing of the fragments by the texturing module, the opacity testing module being configured to: (i) obtain an opacity state map which provides indications of the opacity of texels of a texture that is to be applied to the primitive; and (ii) for each of a plurality of blocks of one or more fragments of the primitive, use the opacity state map to determine a respective opacity state for the fragment block by: (a) determining the position of a block of opacity states within the opacity state map for the fragment block based on the texture co-ordinates of one or more fragments of the fragment block, and (b) performing a conservative combination of the opacity states of the opacity state block to determine the opacity state for the fragment block; wherein the depth testing module and the texturing module are configured to process fragments of the fragment blocks in accordance with the respective determined opacity states of the fragment blocks.

Computer readable code may be adapted to perform the steps of any of the methods described herein when the code is run on a computer. Furthermore, computer readable code may be provided for generating a 3D graphics processing system according to any of the examples described herein. The computer readable code may be encoded on a computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
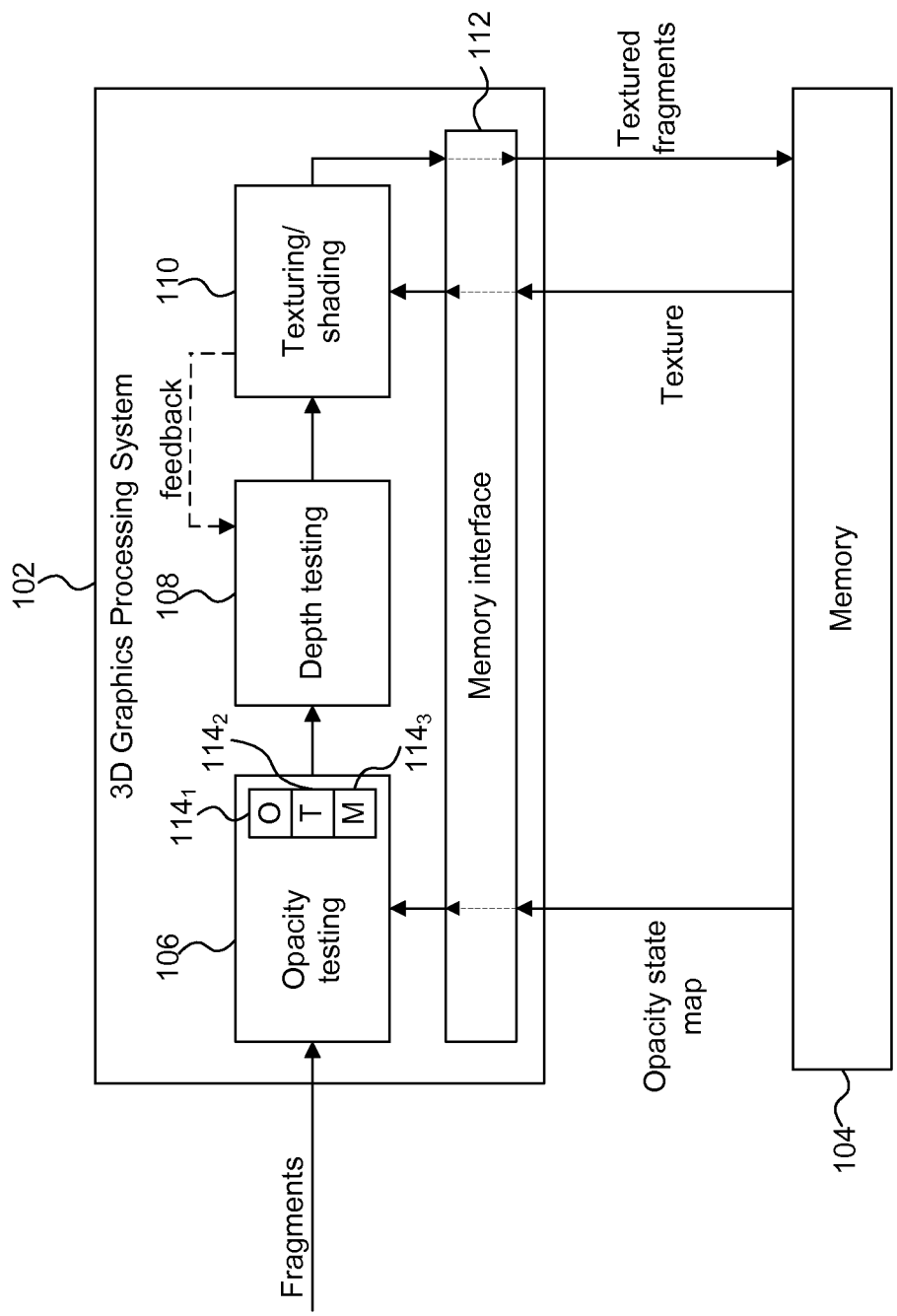
FIG. 1 shows a schematic diagram of a 3D graphics processing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

Embodiments will now be described by way of example only.

FIG. 1 shows an example in which a 3D graphics processing system 102 is coupled to a memory 104. The 3D graphics processing system 102 comprises an opacity testing module 106, a depth testing module 108, a texturing and shading module 110 and a memory interface 112. The opacity testing module 106 comprises three queues $114_1$, $114_2$ and $114_3$ which are configured to store blocks of fragments as described in more detail below. It is noted that the 3D graphics processing system 102 may include further functional modules than those shown in FIG. 1, but for clarity, only the four modules 106 to 112 are shown in FIG. 1 to simplify the description of an embodiment. The opacity testing module 106 is arranged to receive fragments of objects. The opacity testing module 106 is also arranged to receive an opacity state map from the memory 104, via the memory interface 112. An output of the opacity testing module 106 is coupled to an input of the depth testing module 108. An output of the depth testing module 108 is coupled to an input of the texturing and shading module 110. An output of the memory interface 112 is coupled to an input of the texturing and shading module 110. An output of the texturing and shading module 110 is coupled to an input of the memory interface 112. The memory interface 112 is arranged to send data to, and receive data from, the memory 104. It is noted that the texturing and shading module 110 may be configured to perform one or both of texturing and shading on fragments, and for conciseness the texturing and shading module 110 may be referred to herein simply as a "texturing module".

In operation, fragments of primitives to be processed are received at the opacity testing module 106. The fragments of the primitives may be the result of previous processes such as: a rasterization process which converts the location of the objects in a 3D model into a 2D image for display as an image; and a tiling process that determines which primitives at least partially overlap which tiles of the image. The primitives comprise a plurality of vertices (e.g. three vertices) which describe the position and appearance of the objects in the image. As described above, a primitive has an object type (e.g. opaque or non-opaque, where some examples of non-opaque object types are translucent, opaque punch through and translucent punch through) which indicates how the fragments of the primitive are to be processed in the 3D graphics processing system 102. As described above, fragments of a primitive that has a non-opaque object type require additional processing compared to fragments of a primitive with an opaque object type.

Figure 2:
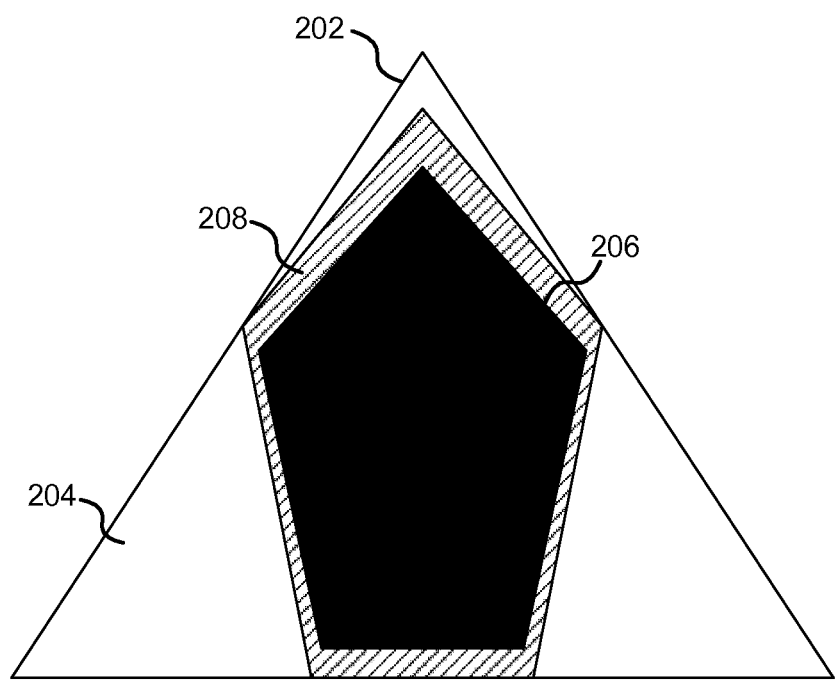
FIG. 2 shows a primitive of a translucent object.

FIG. 2 shows an example of a primitive 202 which has a non-opaque object type. For example, the primitive 202 may have a translucent punch through object type. The primitive 202 is a triangle (defined by three vertices), and may be large enough to include many fragments. Some regions of the primitive 202 are fully transparent (e.g. the texels of the texture for these regions have alpha values of zero) and are shown as clear regions in FIG. 2, denoted 204. A region 206 of the primitive 202 is fully opaque (e.g. the texels of the texture for this region has an alpha value of one) and is shown as a solid black region in FIG. 2. A region 208 of the primitive 202 is neither fully transparent nor fully opaque (e.g. the texels of the texture for these regions have alpha values, $\alpha$, where $0 \leq \alpha \leq 1$) and is shown as a hashed region in FIG. 2.

Figure 8:
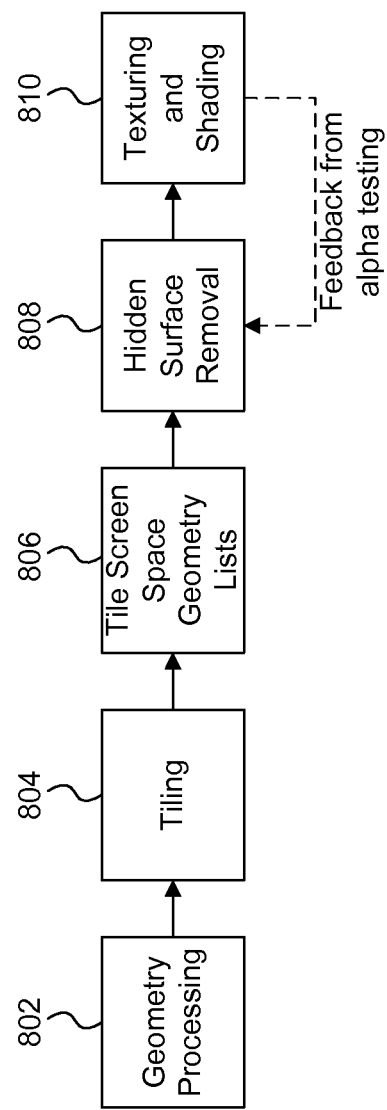
FIG. 8 shows a schematic diagram of a tile based deferred rendering system.

In the 3D graphics processing systems described in the background section above, there is no opacity testing module 106, and instead the fragments are received at a depth testing module (e.g. the hidden surface removal unit 808 shown in FIG. 8 which performs corresponding functions to those performed by the depth testing module 108 in the graphics processing system 102). As described above, in those graphics processing systems, the fragments of a primitive which has a non-opaque object type are passed through to the texturing and shading module (e.g. the TSU 810 shown in FIG. 8, which performs corresponding functions to those performed by the texturing an shading module 110 in the graphics processing system 102) where an alpha test is performed for the fragments using the texture that is to be applied to the fragments. The results of the alpha tests are fed back to the depth testing module (as shown by the dotted line in FIG. 8) such that the depth testing module can correctly update the depth buffer.

It can be seen in FIG. 2, that many of the fragments of the primitive 202 are either fully transparent (in region 204) or fully opaque (in region 206), and yet since the primitive has a non-opaque object type, all of the fragments of the primitive 202 would be processed, in order to determine if they pass or fail the alpha test, in the graphics processing systems described in the background section above.

It has been realised that the processing of the fragments of translucent and punch-through primitives may be simplified by performing an upfront opacity test before at least some of the normal processing of the 3D graphics processing system 102. For example, the opacity test may determine whether any areas of primitives contain only fully transparent fragments or only fully opaque fragments, in which case the processing can be simplified for those areas of the primitives. For example, for a punch-through primitive, if fragments are fully transparent, they may be discarded, or, in the case of a translucent primitive, the object type associated with those fully transparent fragments may be set to indicate that the fragments are transparent and will not be visible in the image such that the depth testing module 108 can handle those fragments accordingly. As another example, if fragments are fully opaque then the object type associated with those fragments may be set to an opaque object type, such that the depth testing module 108 can handle those fragments as opaque fragments, which means they will not cause overlapped fragments to be processed (i.e. they will not cause a pass to be spawned).

Figure 3:
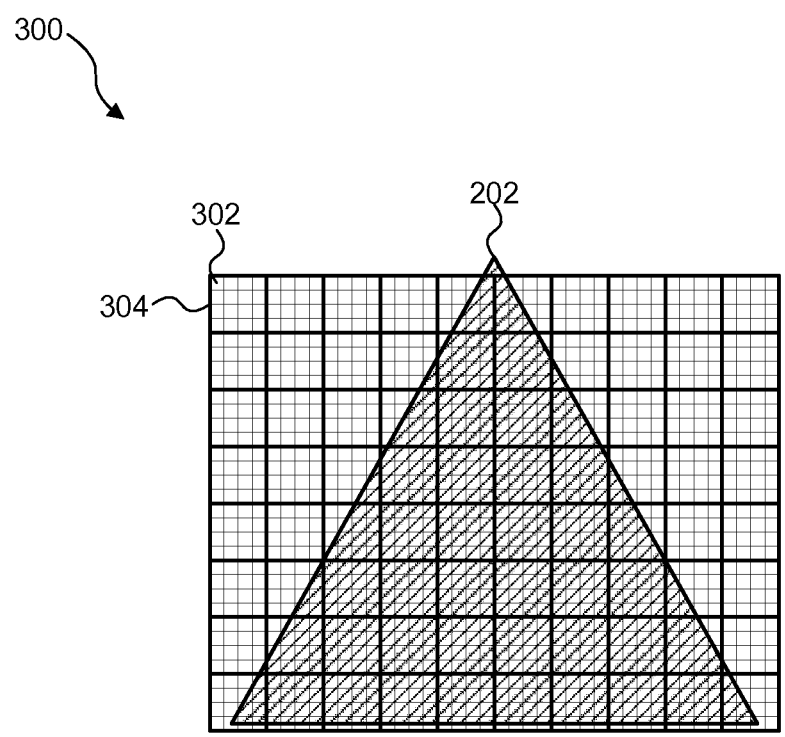
FIG. 3 represents fragments of the primitive on a grid of sample positions of an image.

The opacity testing module 106 determines whether the processing of fragments of the primitive 202 can be simplified. FIG. 3 represents the primitive 202 covering a plurality of sample positions 302 of the image 300. The primitive 202 comprises a plurality of fragments corresponding to sample positions of the image 300. The opacity testing module 106 operates on blocks of one or more fragments of an object. FIG. 3 shows blocks 304 having a size of 4×4 sample positions. Corresponding 4×4 blocks of fragments of the primitive 202 are considered by the opacity testing module 106, i.e. there are sixteen fragments in each block of fragments. As described below, the blocks may be of different sizes in different examples.

Figure 4:
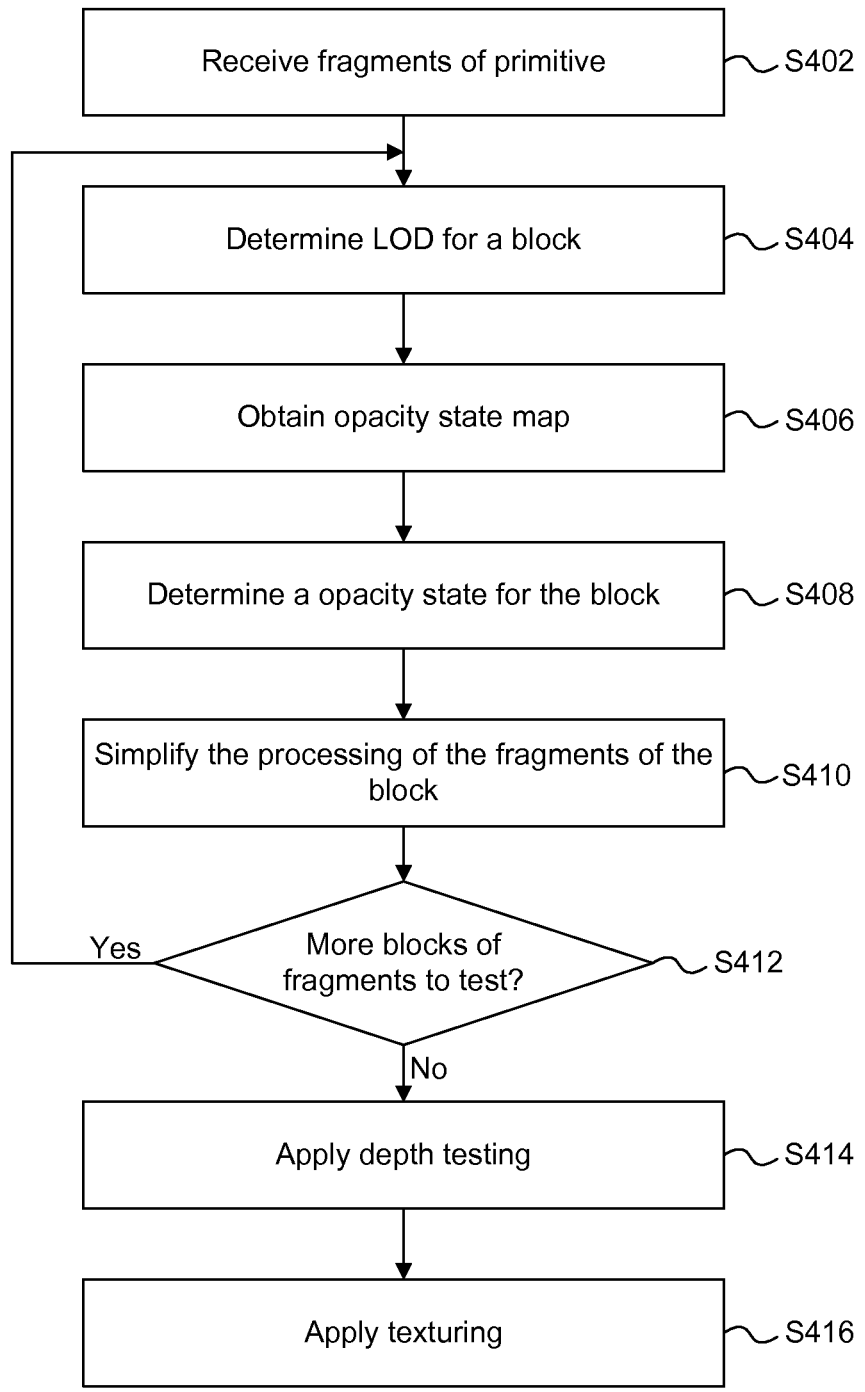
FIG. 4 shows a flow chart for a method of processing an object in the 3D graphics processing system.

With reference to the flow chart shown in FIG. 4 there is now described a method of processing a primitive 202, which has a non-opaque object type. In step S402 fragments of the primitive 202 are received at the opacity testing module 106.

A texture that is to be applied to the fragments of the primitive 202 in the texturing module 110 includes opacity values (e.g. alpha values). The way in which the texture is applied to fragments of the primitive 202 typically has a dependence upon the position and orientation of the primitive 202. For example, if the primitive 202 is far away from the image plane then the texture applied to the fragments of the primitive 202 does not need to be as detailed as if the primitive 202 is close to the image plane. Therefore, the texture is generally stored as a structure (e.g. a mipmap) comprising multiple levels of resolution to represent different levels of detail of the texture. One or more of the levels are used to determine the texturing to be applied to fragments of the primitive 202.

The opacity testing module 106 operates on a block of one or more of the received fragments of the primitive in steps S404 to S412 as described below. The opacity testing module 106 uses an opacity state map (e.g. an alpha state map) to determine an opacity state (e.g. an alpha state) for each block of fragments. The opacity state map provides indications (e.g. low resolution conservative indications) of the opacity of the texels of a texture that is to be applied to the primitive. Since the texture may be applied to the fragments of a primitive at different resolution levels depending upon the position and/or orientation of the primitive in the image, an opacity state map chain may be provided which includes a sequence of opacity state maps at different resolutions. In other words, an opacity state map is a level of an opacity state map chain which comprises a plurality of levels at respective resolutions, wherein the different levels include opacity states corresponding to blocks of texels at different resolution levels of the texture.

As described below, the opacity testing module 106 may perform low resolution opacity testing on blocks of fragments, wherein the block size may, for example, be 4×4 samples or 8×8 samples. Furthermore, the resolution of the opacity state maps in the opacity state map chain may be chosen such that a single opacity state in the highest resolution opacity state map maps to a block of texels of the highest resolution texture having a block size the same as the block size chosen for the front end opacity test. For example, if a block size of 4×4 is chosen then one opacity state within the highest resolution opacity state map corresponds to a 4×4 block of samples within the corresponding texture map. So, as an example, if the texture map was 1024×1024 texels in size then the highest resolution opacity state map will include a 256×256 array of opacity states.

Figure 5:
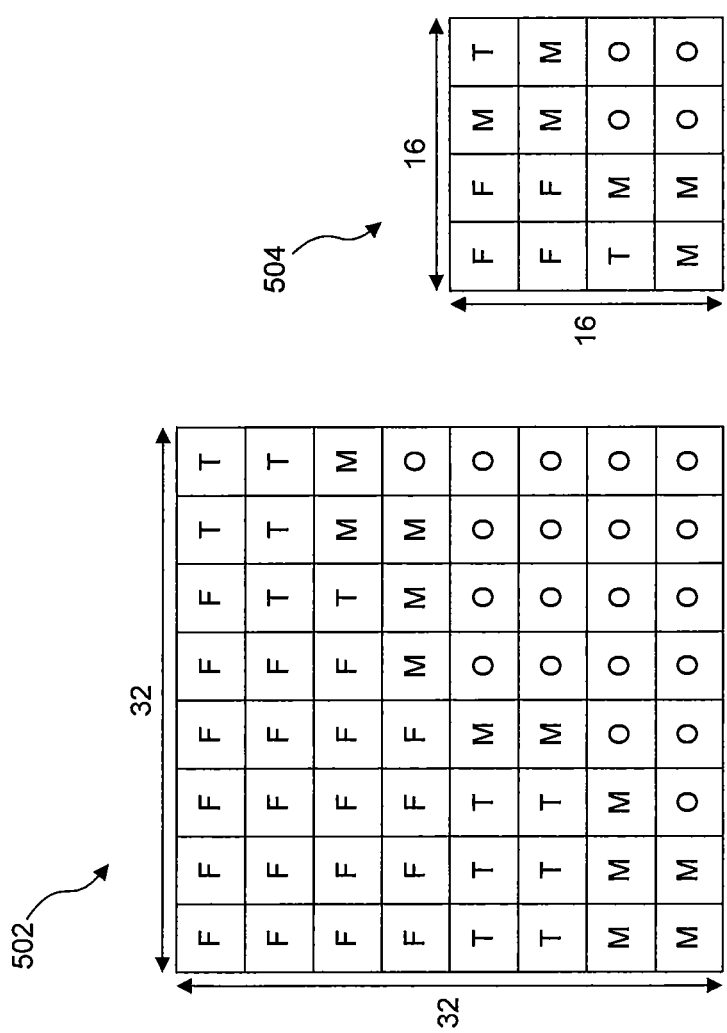
FIGS. 5($a$)-5($d$) show four levels of an opacity state map chain.

For example, the opacity states may be alpha states, and FIGS. 5(a)-5(d) show a chain including four levels of alpha state maps which can be used when the opacity testing module 106 is operating on 4×4 blocks of fragments at a time. In other examples, the opacity testing module 106 may operate on blocks of fragments of different sizes, e.g. 8×8 blocks of fragments. FIG. 5(a) shows an alpha state map 502 at a high level of the alpha state map chain which corresponds to a 32×32 block of texels of the highest resolution texture. For each 4×4 block of texels the alpha state map 502 includes an alpha state, which is represented in FIG. 5 as F, O, T or M, as explained in more detail below.

The top level of the opacity state map chain is a number (N) of levels below the top of the texture mipmap levels, where $N=\log_2(TileSize)$, and where TileSize is the size of one dimension of the blocks of fragments considered in the opacity testing module 106. Generally, for simplicity, both dimensions of the tile are the same, although they could be different. For example, where the fragment blocks are 4×4 blocks then TileSize=4 and N=2.

The generation of the opacity state maps in the opacity state map chain is now described with reference to FIGS. 6 and 7, in which the opacity states are determined in a conservative manner. The opacity states may be determined by the graphics processing system in advance of the use of the opacity states during the processing of fragments. For example, the opacity states may be determined when the texture is uploaded into the texture memory. Alternatively, the opacity states could be determined on-the-fly as the graphics processing system processes the fragments, but this may introduce latency and would require extra processing at the time that the fragments are to be processed, so it is preferable to determine the opacity states before the fragments are processed.

Figure 6:
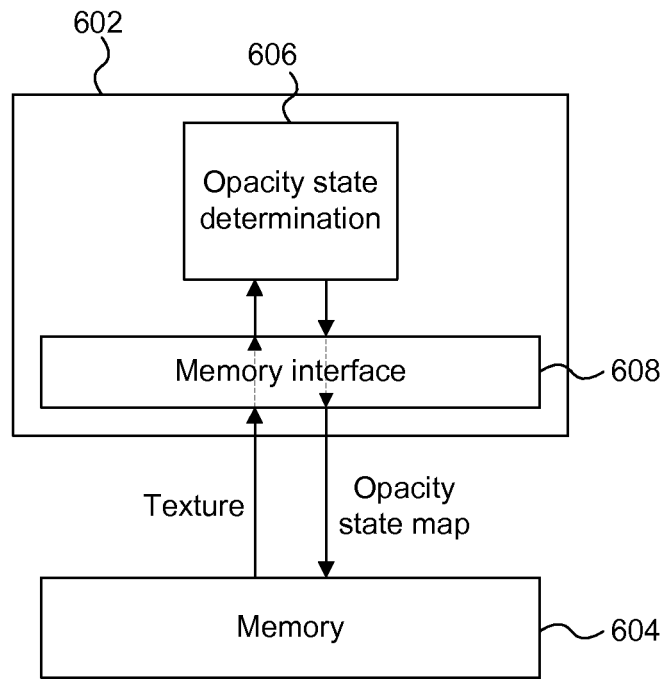
FIG. 6 shows a schematic diagram of a 3D graphics processing system for determining an opacity state map.

FIG. 6 shows a graphics processing system 602 which is configured to generate an opacity state map. The graphics processing system 602 may be, but is not necessarily, the same system as the system 102 shown in FIG. 1. The graphics processing system 602 is coupled to a memory 604. The graphics processing system 602 comprises an opacity state determination module 606 and a memory interface 608. The memory 604 is configured to store a texture.

Figure 7:
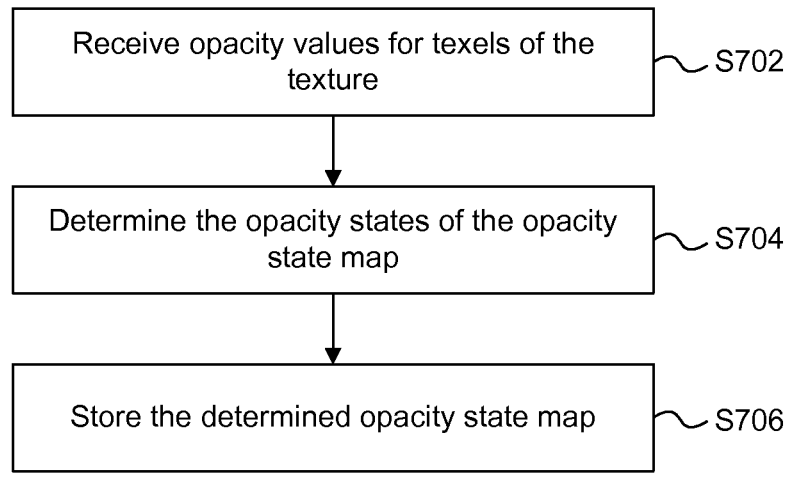
FIG. 7 shows a flow chart for a method of generating an opacity state map.

The flow chart shown in FIG. 7 shows the method steps performed by the graphics processing system 602 to generate the opacity state map. In step S702 the opacity state determination module receives opacity values (e.g. alpha values) for texels of a texture from the memory 604, via the memory interface 608. The full texel values, e.g. RGBA values, of the texture may be received in step S702, or alternatively, only the alpha values of the texture might be received in step S702.

In step S704 the opacity state determination module 606 determines the opacity states of the opacity state map based on the received opacity values in a conservative manner, such that: (i) an opacity state is determined to indicate that a corresponding block of one or more texels is fully transparent only if the opacity values of the texture indicate that all of the one or more texels in the block are fully transparent, and (ii) an opacity state is determined to indicate that a corresponding block of one or more texels is fully opaque only if the opacity values of the texture indicate that all of the one or more texels in the block are fully opaque. In any other scenario, the opacity state is determined to indicate that a corresponding block of one or more texels is neither fully transparent nor fully opaque (even if some, but not all, of the texels in the block are fully transparent or fully opaque).

Referring back to FIG. 5 in which the opacity states are alpha states, if a block in the alpha state map 502 has a letter 'F', this represents that all of the texels of the texture within that 4×4 block are fully transparent, e.g. all of the texels within the block have alpha values of zero. If a block in the alpha state map 502 has a letter 'O', this represents that all of the texels of the texture within that 4×4 block are fully opaque, e.g. all of the texels within the block have alpha values of one. If a block in the alpha state map 502 has a letter 'T', this represents that all of the texels within the 4×4 block are partially transparent i.e. they have alpha values between (but not including) zero and one. If a block in the alpha state map 502 has a letter 'M' then this indicates that the texels within the 4×4 block have a mixture of F, O and/or T states. Therefore, letters T and M both indicate that a corresponding block of one or more texels is neither fully transparent nor fully opaque. If a block has an alpha state of T, this indicates to the depth testing module 108 that none of the texels are completely transparent (i.e. the texels of the block of texels include translucency but will not be discarded by an alpha test operation), which can simplify the way in which the depth buffer is updated i.e. a punch-through object block can be treated as transparent, thereby avoiding unnecessary per fragment alpha testing. The processing of blocks with an alpha state of M is not simplified and they are processed as they would have been in the depth testing module 108 and the texturing module 110 if the opacity testing module 106 were not implemented in the graphics processing system 102.

FIGS. 5(b), 5(c) and 5(d) show alpha state maps 504, 506 and 508 for the corresponding next levels down in the original texture map chain i.e. for the 16×16, 8×8 and 4×4 texture. For each alpha state map level a corresponding 4×4 block of texels from the appropriate mipmap level of the texture is used to conservatively derive each of the alpha states in the alpha state maps 504, 506 and 508 as described for alpha state map 502.

In step S706 the opacity state determination module 606 sends the determined opacity state maps to the memory 604 via the memory interface 608 and the opacity state maps are stored in the memory 604 for subsequent use by the 3D graphics processing system 102.

In the example described above, there are four possible alpha states (F, O, T and M). Therefore, two bits can be used to indicate each alpha state. In other examples, there may be different alpha states which may be represented by a different number of bits.

Returning now to the method shown in FIG. 4, as mentioned above, the opacity testing module 106 operates on a block of one or more of the received fragments of a primitive in steps S404 to S412. For example, each block may be a 4×4 block of fragments of the primitive. In step S404 the opacity testing module 106 determines an indication of a level of detail with which the texture is to be applied to the block of fragments. Calculations of a level of detail (LOD) indication are known in the art for determining which resolution level of a texture to apply to fragments of an object, and similar calculations may be performed in step S404. For example an LOD calculation may be based on calculating the rate of change of texel position between adjacent fragment positions. For each fragment in the block, texture co-ordinates (U and V) and a reciprocal homogeneous depth (RHW) value are received with the fragments at the opacity testing module 106. The RHW value gives an indication of the depth of a fragment, for example a smaller RHW value may correspond to a more distant fragment. An indication of the relative level of detail for a particular block of fragments may be determined by determining the RHW values of the fragments at a plurality of positions associated with the particular block, and using the most distant of the determined RHW values to determine said indication of a level of detail for the particular block. For example, an LOD calculation may be performed for whichever corner of the block of fragments has the most distant RHW value since this will give the LOD appropriate for the furthest of the four corner fragments of the block. The greatest rate of change occurs at the sample point with the most distant RHW values, so calculating the LOD at a single sample point with the most distant RHW value gives a conservative result of the LOD for the block. Alternatively, the LOD could be fully determined at the four corners of the block in order to determine where the greatest rate of change occurs.

In step S406 an opacity state map (e.g. alpha state map) is obtained for the block based on the LOD indication. In particular, the indication of the LOD is used to select one of the levels of the opacity state map chain for use as the opacity state map for the block.

In step S408 an opacity state for the block of fragments is determined using the opacity state map obtained in step S406. The position of one or more opacity states within the opacity state map which correspond to the block of fragments is determined based on the texture co-ordinates (e.g. U and V values) of one or more fragments of the block. For example, a 2×2 block of opacity states from the selected opacity state map is used to determine an opacity state for the block of fragments. This is done in a conservative manner such that the opacity state of the block of fragments is only determined to be transparent if all of the opacity states in the 2×2 block of the opacity state map are transparent; and the opacity state of the block of fragments is only determined to be opaque if all of the opacity states in the 2×2 block of the opacity state map are opaque. If there is a mixture of opacity states in the 2×2 block of the opacity state map then the opacity state of the block of fragments is given a value of 'M', i.e. neither fully transparent nor fully opaque. If all of the opacity states in the 2×2 block of the opacity state map have a value of 'T' then the opacity state of the block of fragments is given a value of 'T' indicating that all of the corresponding texels of the texture are partially, but not fully, transparent. A 2×2 block of opacity states is used to determine an opacity state for a block of fragments because the position of the block of fragments will normally correspond to a non-integral position in the opacity state map. The conservative combination of four closest opacity states is then analogous to bilinear filtering of four texels in a texture lookup.

If possible, in step S410 the opacity testing module 106 simplifies the processing of the fragments of the blocks which are received having a non-opaque object type by either: (a) based on the determined opacity states for the blocks, indicating that the fragments of one or more of the blocks are to be associated with a different object type to the non-opaque object type for subsequent processing of the fragments, or (b) discarding one or more of the blocks based on the determined opacity states for the blocks.

As a matter of terminology, it is noted that a block is "discarded" if further processing on the block is prevented or avoided, whether or not the block of fragments is actively removed from a memory. Furthermore, the process of indicating that the fragments of a block are to be associated with a different object type may comprise either: (i) adapting the object type associated with the fragments of the block to be said different object type; or (ii) setting an indicator (e.g. a flag) to indicate that the fragments of the block are to be associated with the different object type for subsequent processing. In option (ii) the object type of the fragments is not adapted but the way in which the fragments are subsequently processed will be changed as if the object type had been changed.

As an example, for a translucent punch-through primitive the opacity testing module 106 may perform the following actions based on the opacity state of the block of fragments:

If the opacity state is 'F' (i.e. the block is fully transparent) then the block may be discarded because all of the fragments would be discarded eventually by alpha testing since they are fully transparent.

If the opacity state is 'O' (i.e. the block is fully opaque) then the object type associated with the fragments of the block may be adapted to be an opaque object type (or a flag may be set to indicate that the fragments may be treated as if they were opaque), such that no alpha testing or alpha blending is required.

If the opacity state is 'T' (i.e. the block is partially but not fully transparent) then the object type associated with the fragments of the block may be adapted to be a translucent object type (or a flag may be set to indicate that the fragments may be treated as if they were translucent), for which no alpha test is required, but alpha blending may still be implemented.

If the opacity state is 'M' (i.e. the block contains a mixture of opacity states) then the object type is not adapted and the fragments are treated with their original object type, e.g. as a punch through object type including translucency.

Opaque punch through primitives are treated in the same way as the translucent punch-through primitives described above, but for opaque punch-through primitives there will be no opacity states of 'T' because fragments are either fully opaque or fully transparent according to the opaque punch-through object type.

As another example, for a translucent primitive the opacity testing module 106 may perform the following actions based on the opacity state of the block of fragments:

If the opacity state is 'F' (i.e. the block is fully transparent) then flags may be set to indicate that the fragments of the block are not to be transmitted to the texturing module 110 for subsequent texturing. In this case, the fragments are not completely discarded, but the fragments are prevented from being textured because they are fully transparent. For example, flags (e.g. 'tag write disable' flags) may be set to indicate that the fragments of the block are not to be written into an output buffer (e.g. the tag buffer). If a 'tag write disable' flag is set for a fragment then the depth of the fragment may be used to update the depth buffer in the depth testing module 108 but a tag for the fragment should not be written into the tag buffer, such that the fragment will not be processed further down the pipeline. A separate flag may be set for each fragment of the block which has an opacity state 'F', or alternatively, a single flag may be set for the fragments of the block which has an opacity state 'F'.

If the opacity state is 'O' (i.e. the block is fully opaque) then the object type associated with the fragments of the block may be adapted to be an opaque object type (or a flag may be set to indicate that the fragments may be treated as if they were opaque), such that no alpha blending is required and tag buffer flushes (pass spawning) may be avoided.

If the translucency state is 'T' or 'M' then the object type is not adapted and the fragments are treated with their original object type.

A primitive (e.g. primitive 202) may contain a mixture of fragment blocks with different opacity states. It is useful for blocks from a primitive with a non-punch through object type to be processed before blocks from the primitive with a punch-through object type. As described below, this avoids the punch-through blocks causing a tag buffer flush prior to opaque blocks overwriting tag buffer contents. In order to implement this, the fragment blocks which are not discarded following step S410 are submitted into one of the three first-in-first-out (FIFO) queues $114_1$, $114_2$ or $114_3$.

The fragments associated with an opaque object type are stored in the queue $114_1$. The fragments associated with a translucent object type are stored in the queue $114_2$. The fragments associated with a punch-through or a mixed object type are stored in the queue $114_3$.

In step S412 it is determined whether there are more blocks of fragments left to test in the opacity testing module 106 for the current primitive. If there are, then the method passes back to step S404 and the method steps S404 to S412 are repeated for a new block of fragments. When all of the blocks of fragments for a primitive have been processed by the opacity testing module 106 then in step S412 is it determined that there are no more blocks of fragments to test for the primitive and the system moves onto the next primitive.

In step S414 the depth testing module 108 applies depth testing to fragments in accordance with their associated object types (which, due to step S410, may be different to the object type with which the fragments were received at the opacity testing module 106). As described above, fragments may be associated with different object types, and therefore may be stored in different ones of the queues $114_1$ to $114_3$. The order of processing fragments of a tile may be such that: fragments from the opaque FIFO $114_1$ are passed to the depth testing module 108 first, followed by fragments from the translucent FIFO $114_2$, and then finally fragments from the punch-through/mixed FIFO $114_3$. This avoids the punch-through blocks causing a tag buffer flush prior to opaque blocks overlapping tag buffer contents. That is, opaque blocks are given a chance to replace the tags of any overlapped primitives before translucent or punch-through blocks cause a flush of the tag buffer. Furthermore, in order to prevent fragments of different primitives being processed out of submission order, the primitives are delimited within the queues $114_1$ to $114_3$ with a 'New Primitive' marker. The queue from which fragments are passed to the depth testing module 108 changes to the next queue each time a New Primitive marker is encountered in a queue.

As described above, a depth buffer is used for the depth testing and a tag buffer stores the primitive tags of the most recent fragments to pass the depth tests at each sample position of a tile. The contents of the tag buffer are flushed to the texturing and shading module 110 when all of the primitives in a tile have been depth tested or, as described above, when a non-opaque fragment passes the depth test. The output of the depth testing module 108 comprises opacity tested and depth tested fragments. These fragments are passed to the texturing and shading module 110. The texturing and shading module 110 also receives one or more textures from the memory 104 (via the memory interface 112). In step S416 the texturing and shading module 110 applies texturing and shading to the fragments and outputs textured and shaded fragments. The textured and shaded fragments may pass to the memory 104 (via the memory interface 112) for storage therein. The textured and shaded fragments represent the pixels of the rendered image, and may be stored in a frame buffer. The pixels of the rendered image may be used in any suitable manner, e.g. they may be displayed on a display.

In the examples described above, the opacity testing module 106 is arranged to process fragments prior to the depth testing of the fragments performed by the depth testing module 108. In this way, the depth testing process is simplified for example since fully transparent fragments may be discarded before reaching the depth testing module 108 or a flag (e.g. a 'tag write disable' flag) may be set such that the depth testing module 108 does not need to update the tag buffer based on those fragments such that those fragments never reach the texturing and shading module 110. The depth testing process is further simplified since fully opaque fragments may be set to an opaque object type resulting in the texturing and shading module 110 receiving fewer flushes from the tag buffer, and a reduction in overdraw. Furthermore, setting fully opaque fragments to an opaque object type allows the depth testing to treat those fragments as opaque fragments, for which the updating of the tag buffer is simpler than for fragments having an object type which allows for some translucency.

However, in some other examples, the opacity testing module may be arranged to process fragments subsequent to, or in parallel with, the depth testing of the fragments performed by the depth testing module. The advantages mentioned above would not be realised in these other examples, but there may still be some benefit to implementing the opacity testing before the texturing and shading module 110 applies texturing and/or shading to the fragments. The texturing/shading process includes reading textures from the memory 104, which means that a large amount of data is transferred from the memory 104 to the graphics processing system 102.

For example, a texture may include 32 bits of data for each texel (e.g. 8 bits for each of a Red, a Green, a Blue and an alpha value). Furthermore, the texturing process may include performing complex operations to correctly map the texture onto the fragments of an object. In contrast, the opacity testing uses the opacity state maps which include an opacity state value (e.g. comprising two bits) for each block of texels, e.g. 4×4 block of texels, so the amount of data representing the opacity state maps that is read into the opacity testing module 106 is much less than the amount of data in the texture that is read into the texturing module 110. Therefore, if by implementing the opacity testing before the texturing is applied, some of the fragments (e.g. transparent fragments) can be discarded and/or some of the object types of the fragments can be adapted (e.g. the object type of opaque fragments can be adapted to be an opaque object type) then the texturing process implemented by the texturing module 110 may be simplified. This is true even if the opacity testing module 106 is not implemented before the depth testing module 108.

An advantage of implementing the opacity testing module 106 after the depth testing module 108 is that the depth testing module 108 will remove some surfaces that are hidden by closer objects, such that the opacity testing would not need to be performed for the fragments which were removed. In this way, the amount of processing performed the opacity testing module 106 can be reduced.

In the examples described above, the blocks of fragments for which opacity states are determined are 4×4 blocks of fragments. In other examples, the blocks may comprise a different number of fragments, e.g. 8×8 blocks or 2×2 blocks. In some examples, the blocks may each comprise just one fragment. In those examples, the opacity testing module 106 performs per-fragment operations. Furthermore, in alternative examples, it may be the case that the blocks are not all the same size as each other.

By considering the fragments in blocks comprising more than one fragment (e.g. in 4×4 blocks), the processing performed by the opacity testing module 106 is simplified because per-fragment operations are not performed, and instead a coarser processing of the fragments is performed. A larger block size means that fewer operations need to be carried out in the opacity testing module 106, but the results do not simplify the subsequent processing so much, e.g. because blocks are only treated as transparent if all of the fragments in the block are transparent and e.g. because blocks are only treated as opaque if all of the fragments in the block are opaque. Therefore, when selecting the block size, there is a trade-off to consider between the number of operations being carried out in the opacity testing module 106 and the simplification of the subsequent processing that is achieved. In view of this trade-off, if there are more processing resources available for processing a primitive then the block size may be lower. Therefore, in some examples, the number of fragments within the blocks may be set based on an analysis of the processing resources available for processing the primitive.

Furthermore, in some examples, the opacity testing may perform steps S404 to S412 using blocks comprising a first number of fragments (e.g. using 8×8 blocks), and then repeat steps S404 to S412 using blocks comprising a second number of fragments (e.g. using 4×4 blocks), wherein the first number is greater than the second number. In this way a fast, coarse (e.g. 8×8) opacity test is performed to simplify the processing for large (e.g. 8×8) blocks of fragments, e.g. by discarding the transparent blocks or by adapting the object types of the blocks. Then a finer (e.g. 4×4) opacity test is performed on the results of the coarse translucency test to simplify the processing for the remaining, finer (e.g. 4×4) blocks of fragments, e.g. by discarding the transparent blocks or by adapting the object types of the blocks. A two stage opacity test such as this allows large areas of primitives to be simplified quickly by performing the opacity test on a coarse scale, but does not lose out on simplifying smaller areas of primitives because the second, finer test is performed. This may be quicker than performing a single, fine test (e.g. at the scale of 4×4 blocks). In general, a multi-stage opacity test may include two or more stages, in which opacity tests are performed at different scales in the different stages.

In the examples described above, the opacity state map is different from the alpha values of the texels of the texture and step S406 of obtaining the translucency state map comprises retrieving the opacity state map from the memory 104, e.g. which has been generated according to the method shown in FIG. 7 as described above. The opacity state map chain may be different to the texture mipmap chain, but the information representing the opacity state map chain may be encoded within the texture itself.

In other examples, step S406 of obtaining an opacity state map may comprise retrieving the texture from the memory 104 and using the opacity values (e.g. the alpha values) of the retrieved texture as the opacity state map. However, if a standard mipmap generation process is used for generating the levels of the texture, due to the limited precision of the alpha channel within the texture, lower mipmap levels may erroneously indicate that all texels in the level above are fully opaque or fully transparent. For example, for an opacity block size of 4×4 texels, the sampling of the alpha state is pushed down two mipmap levels making each alpha state represent 16 texels of the texture that would be sampled by normal texturing. If 15 of the contributing 16 texels are zero and one texel has a binary value of 1 the typical approach to generating mipmaps would result in a value of 0 being placed in the lower map level. For the purposes of determining the opacity state of the 4×4 block this would generate an incorrect result i.e. the tile would be marked as 'F' when it should be marked as 'M'. To avoid this, the opacity values (e.g. the alpha values) of the texture may be set in a conservative manner such that they are suitable for use as the opacity state map, in accordance with the description given above. For example if a texture has an 8 bit alpha channel the mip map generation code would be modified such that:

- Where standard mipmap generation produces an alpha value of 0xFF (i.e. a value of one) and not all the contributing texels were also 0xFF, then the resulting value should be modified to be 0xFE (i.e. less than one), such that the alpha value does not indicate that all of the contributing texels are opaque; and
- Where standard mipmap generation produces an alpha value of 0x00 (i.e. a value of zero) and not all the contributing texels were also 0x00, then the resulting value should be modified to be 0x01 (i.e. greater than zero), such that the alpha value does not indicate that all of the contributing texels are transparent.

It may be preferable to use a separate opacity state map chain rather than modifying the alpha values of the texture because modifying the alpha values of the texture may become problematic for lower precision or compressed formats where the movement of a single alpha step up or down as described above could result in a significant visual difference. In addition it's possible that modifying the mipmap levels in this manner, when they are supplied by the application, may result in conformance test failures.

As described in the examples above, the opacity states may comprise indications of the alpha states of texels of the texture which is arranged to be applied to the fragments of a block. Alternatively, or additionally, the opacity states may comprise indications of the colour state of the texels of the texture. Additive blending can be used to apply translucencies to a scene, and the level of opacity may be determined by the RGB values of the texture. For example, "black" texels represent fully transparent texels, with "coloured" texels not being fully transparent. There might be no fully opaque state represented by the RGB values of the texture. Therefore, in an example, the colour state may take one of two possible values, and can be represented by one bit. For example, the colour state in an opacity state map representing a block of one or more texels may be: (i) a "black state" (13') which indicates that all of the texels in the block are black, i.e. there is an absence of colour, or (ii) a "coloured state" ('C') which indicates that one or more texels in the block are not black. Where a texel has colour values in RGB format or RGBA format, the texel is black if the red value, R=0, the green value, G=0, and the blue value, B=0. For texels where any of the R, G or B values are not zero, the texel is considered to be coloured. Where a block comprises a plurality of texels with different colour states, a colour state for the block is black ('B') only if the colour state of all of the texels within that block is black, otherwise the colour state for the block is coloured ('C'). Therefore, the colour state for blocks is determined in a conservative manner.

An opacity state map of colour states can be applied to blocks of fragments at the opacity testing module 106 in the same way as described above in relation to an opacity state map of alpha states. If the colour state of a block of fragments is black then the block will not contribute to the final colour of the fragments, so a flag such as a 'tag write disable' flag can be set for the fragments of that block. This may simplify the subsequent processing of the block of fragments. However, if the colour state of a block of fragments is coloured then the block may contribute to the final colour of the fragments, and the processing of the fragments cannot be simplified as a result of the analysis of the colour state of the block.

The opacity states in the opacity state maps may include indications of the colour states and/or the alpha states. Therefore, as an example, each opacity state value may comprise:
- one bit, if the opacity states are only colour states;
- two bits, if the opacity states are only alpha states; or
- three bits, if the opacity states include both alpha states and colour states.

We provide below indications of the approximate scale of some of the benefits that can be achieved in the examples described herein. There may be a benefit in terms of the fill rate that can be achieved. Fill rate is the rate at which texture samples can be applied to fragments. Sampling of the opacity state maps may consume some proportion of the available fill rate. In the worst case, for a single textured object with no fully transparent blocks (i.e. so no fragment blocks are discarded by the opacity testing module 106), at a fragment block size of 4×4, the opacity testing module 106 would consume 4 additional opacity state map samples per 16 texture map samples i.e. a 25% increase in number of samples, which equates to only achieving 80% of peak fill rate, in the worst case. However this ignores the fact that fragment blocks that have a fully transparent state will perform no further sampling, so if, for example, 50% of blocks were fully transparent this approach would result in ~177% of the peak fill rate that would be achieved without the opacity testing module 106. This is a significant benefit. In addition, fragment blocks that are fully opaque contribute to a reduction in overdraw, meaning that fill rate is not consumed by fragments that are hidden behind others.

There may also be a benefit in terms of the amount of data that is transferred between the memory 104 and the graphics processing system 102. Sampling of the opacity state maps involves transferring the data of the opacity state maps from the memory 104 to the opacity testing module 106. However, for a fragment block, the number of opacity states fetched from the memory will be less than the number of texels in the original sample texture map level. In addition, the opacity state values will usually each comprise fewer bits than each of the alpha values of the texture. So the extra data that is fetched from the memory 104 for the purpose of the opacity testing may be significantly less than the data of the alpha values of the texels that would otherwise be fetched for an alpha test.

Further, as with fill rate, the amount of data fetched from the memory 104 is reduced by the combined effect of there being no additional sampling on fully transparent blocks and due to a reduction in overdraw for opaque blocks.

In FIG. 1 and in the examples described above the opacity testing module 106 is separate to the depth testing module 108. However, in some examples, the opacity testing module 106 and the depth testing module 108 could be implemented within the same functional unit.

The examples described above, relate to a graphics processing system implementing deferred rendering wherein the texturing and shading are applied after the depth testing. However, it would also be useful to include the opacity testing module 106 in non-deferred graphics processing systems in which the texturing and shading are applied before the depth testing. The opacity testing would be performed before the texturing so that the processing of some blocks of fragments can be simplified, e.g. by discarding transparent blocks or setting opaque blocks to have an opaque object type.

Generally, any of the functions, methods, techniques or components described above can be implemented in modules using software, firmware, hardware (e.g., fixed logic circuitry), or any combination of these implementations. The terms "module," "functionality," "component", "block", "unit" and "logic" are used herein to generally represent software, firmware, hardware, or any combination thereof.

In the case of a software implementation, the module, functionality, component or logic represents program code that performs specified tasks when executed on a processor (e.g. one or more CPUs). In one example, the methods described may be performed by a computer configured with software in machine readable form stored on a computer-readable medium. One such configuration of a computer-readable medium is signal bearing medium and thus is configured to transmit the instructions (e.g. as a carrier wave) to the computing device, such as via a network. The computer-readable medium may also be configured as a non-transitory computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The software may be in the form of a computer program comprising computer program code for configuring a computer to perform the constituent portions of described methods or in the form of a computer program comprising computer program code means adapted to perform all the steps of any of the methods described herein when the program is run on a computer and where the computer program may be embodied on a computer readable medium. The program code can be stored in one or more computer readable media. The features of the techniques described herein are platform-independent, meaning that the techniques may be implemented on a variety of computing platforms having a variety of processors.

Those skilled in the art will also realize that all, or a portion of the functionality, techniques or methods may be carried out by a dedicated circuit, an application-specific integrated circuit, a programmable logic array, a field-programmable gate array, or the like. For example, the module, functionality, component or logic may comprise hardware in the form of circuitry. Such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnects, by way of example. Such elements may be provided as custom circuits or standard cell libraries, macros, or at other levels of abstraction. Such elements may be interconnected in a specific arrangement. The module, functionality, component or logic may include circuitry that is fixed function and circuitry that can be programmed to perform a function or functions; such programming may be provided from a firmware or software update or control mechanism. In an example, hardware logic has circuitry that implements a fixed function operation, state machine or process.

It is also intended to encompass software which "describes" or defines the configuration of hardware that implements a module, functionality, component or logic described above, such as HDL (hardware description language) software, as is used for designing integrated circuits, or for configuring programmable chips, to carry out desired functions. That is, there may be provided a computer readable storage medium having encoded thereon computer readable program code for generating a 3D graphics processing system configured to perform any of the methods described herein, or for generating a 3D graphics processing system comprising any apparatus described herein.

The term 'processor' and 'computer' are used herein to refer to any device, or portion thereof, with processing capability such that it can execute instructions, or a dedicated circuit capable of carrying out all or a portion of the functionality or methods, or any combination thereof.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It will be understood that the benefits and advantages described above may relate to one example or may relate to several examples.

Any range or value given herein may be extended or altered without losing the effect sought, as will be apparent to the skilled person. The steps of the methods described herein may be carried out in any suitable order, or simultaneously where appropriate. Aspects of any of the examples described above may be combined with aspects of any of the other examples described to form further examples without losing the effect sought.

The invention claimed is:

1. A method of processing a primitive in a 3D graphics processing system to apply depth testing and texturing to the primitive, wherein the primitive has a non-opaque object type, and wherein the texturing comprises texturing fragments of the primitive in accordance with the object type associated with the fragments, the method comprising:
   receiving fragments of the primitive to be processed, the received fragments of the primitive being associated with said non-opaque object type;
   prior to applying texturing to received fragments of the primitive:
   (i) obtaining an opacity state map which provides indications of the opacity of texture elements (texels) of a texture that is to be applied to the primitive;
   (ii) for each of a plurality of blocks of one or more fragments of the primitive, using the opacity state map to determine a respective opacity state for the fragment block by: (a) determining the position of a block of opacity states within the opacity state map for the fragment block based on the texture co-ordinates of one or more fragments of the fragment block, and (b) determining the opacity state for the fragment block based on a predefined combination of the opacity states of the opacity state block; and
   (iii) using the determined opacity states for the fragment blocks to perform one or more of: (a) based on the determined opacity states, indicating that the fragments of one or more of the fragment blocks are to be associated with a different object type to said non-opaque object type for subsequent processing of the fragments, (b) discarding one or more of the fragment blocks based on the determined opacity states, and (c) based on the determined opacity states, setting one or more flags to indicate that the fragments of one or more of the fragment blocks are not to be transmitted for subsequent texturing;
   applying depth testing to fragments of the primitive; and
   applying texturing to fragments of the primitive in accordance with their associated object types as adjusted based on said fragment block opacity states.

2. The method of claim 1 wherein said depth testing is applied to fragments of the primitive subsequent to said simplification and in accordance with their associated object types.

3. The method of claim 1 wherein each of the fragment blocks comprises a plurality of fragments.

4. The method of claim 1 further comprising setting the number of fragments within the fragment blocks based on an analysis of the processing resources available for the processing of the primitive.

5. The method of claim 1 wherein steps (i) to (iii) are performed using fragment blocks comprising a first number of fragments, and then steps (i) to (iii) are repeated using fragment blocks comprising a second number of fragments, wherein the first number is greater than the second number.

6. The method of claim 1 wherein said obtaining the opacity state map comprises retrieving the opacity state map from a store, wherein the opacity state map is different from the alpha values of the texture.

7. The method of claim 1 wherein said obtaining the opacity state map comprises retrieving a texture from a texture memory and using the opacity values of the retrieved texture as the opacity state map, wherein the opacity values of the texture are set in a conservative manner such that they are suitable for use as the opacity state map.

8. The method of claim 1 wherein the texture comprises a plurality of resolution levels, and wherein the opacity state map is a level of a opacity state map chain which comprises a plurality of levels at respective resolutions, wherein the different levels of the opacity state map chain include opacity states corresponding to blocks of texels at different resolution levels of the texture.

9. The method of claim 8 further comprising:
   determining an indication of a level of detail with which the texture is arranged to be applied to a particular fragment block of fragments of the primitive; and
   using the determined indication of the level of detail to select one of the levels of the opacity state map chain for use as the opacity state map for the particular fragment block.

10. The method of claim 1 wherein the opacity state of the opacity state map for a block of texels comprises one or both of: (i) an indication of the alpha state of the texels of the block, and (ii) an indication of the colour state of the texels of the block.

11. A 3D graphics processing system configured to process a primitive by applying depth testing and texturing to the primitive, wherein the primitive has a non-opaque object type, the system comprising:
- a depth testing module configured to apply depth testing to fragments of the primitive;
- a texturing module configured to apply texturing to fragments of the primitive in accordance with the object type associated with the fragments; and
- an opacity testing module arranged to operate on fragments of the primitive prior to texturing of the fragments by the texturing module, the opacity testing module being configured to:
  - (i) obtain an opacity state map which provides indications of the opacity of texels of a texture that is to be applied to the primitive;
  - (ii) for each of a plurality of blocks of one or more fragments of the primitive, use the opacity state map to determine a respective opacity state for the fragment block by: (a) determining the position of a block of opacity states within the opacity state map for the fragment block based on the texture co-ordinates of one or more fragments of the fragment block, and (b) determining the opacity state for the fragment block based on a predefined combination of the opacity states of the opacity state block; and
  - (iii) use the determined opacity states for the fragment blocks to perform one or more of: (a) based on the determined opacity states, indicating that the fragments of one or more of the fragment blocks are to be associated with a different object type to said non-opaque object type for subsequent processing of the fragments, (b) discarding one or more of the fragment blocks based on the determined opacity states, and (c) based on the determined opacity states, setting one or more flags to indicate that the fragments of one or more of the fragment blocks are not to be transmitted to the texturing module for subsequent texturing;
- wherein the texturing module is configured to apply texturing to fragments of the primitive in accordance with their associated object types as determined by said opacity testing module.

12. The system of claim 11 wherein the opacity testing module is arranged to operate on fragments of the primitive prior to depth testing of the fragments by the depth testing module, and wherein the depth testing module is configured to apply depth testing to fragments of the primitive in accordance with their associated object types.

13. The system of claim 11 wherein the opacity testing module is arranged to operate on fragments of the primitive subsequent to, or in parallel with, depth testing of the fragments by the depth testing module.

14. The system of claim 11 wherein the opacity testing module is configured to discard a particular fragment block or set flags indicating that the fragments of the particular fragment block are not to be written into an output buffer if the opacity state for the particular fragment block indicates that every fragment in the particular fragment block is transparent.

15. The system of claim 11 wherein the opacity testing module is configured to indicate that the fragments of a particular fragment block are to be associated with an opaque object type for subsequent processing of the fragments if the opacity state for the particular fragment block indicates that every fragment in the particular fragment block is opaque.

16. The system of claim 11 wherein the texturing module is further configured to apply shading to fragments of the primitive in accordance with their associated object types as determined by said opacity testing module.

17. A 3D graphics processing system configured to generate an opacity state map comprising a plurality of opacity states for use in processing a primitive, wherein each of the opacity states of the opacity state map indicates the opacity of a texture element (texel) block of one or more texels of a texture and wherein each of the opacity states indicates that the corresponding texel block of one or more texels is: (i) fully transparent, (ii) fully opaque, or (iii) neither fully transparent nor fully opaque, the system comprising:
- an input for receiving opacity values for texels of the texture;
- an opacity state determination module configured to determine the opacity states of the opacity state map based on the received opacity values such that: (i) an opacity state is determined to indicate that a corresponding texel block of one or more texels is fully transparent only if the opacity values of the texture indicate that all of the one or more texels in the texel block are transparent, and (ii) an opacity state is determined to indicate that a corresponding texel block of one or more texels is fully opaque only if the opacity values of the texture indicate that all of the one or more texels in the texel block are opaque; and
- wherein the opacity state determination module is further configured to send the determined opacity state map to a store for storage therein, the determined opacity state map being for subsequent use in a method of processing a primitive in the 3D graphics processing system;
- wherein the opacity state determination module is configured to determine the opacity states such that a block of opacity states within the opacity state map is to be used to determine an opacity state for a block of one or more fragments based on a predefined combination of the opacity states of the opacity state block.

18. The system of claim 17 wherein there are two opacity states which indicate that the corresponding texel block of one or more texels is neither fully transparent nor fully opaque, these two opacity states further indicating respectively that: (i) all of the texels in the corresponding texel block are partially but not fully transparent, and (ii) the texels in the corresponding texel block have a mixture of different opacity states.

19. The system of claim 17 wherein the texture comprises a plurality of resolution levels, and wherein the opacity state map is a level of a opacity state map chain which comprises a plurality of levels at respective resolutions, wherein the different levels of the opacity state map chain include opacity states corresponding to blocks of texels at different resolution levels of the texture.

20. The system of claim 17 wherein each of the texel blocks comprises a plurality of texels.

21. The system of claim 17 wherein the opacity state of the opacity state map for a texel block comprises one or both of: (i) an indication of the alpha state of the texels of the texel block, and (ii) an indication of the colour state of the texels of the texel block.

22. A 3D graphics processing system configured to process a primitive by applying depth testing and texturing to the primitive, wherein the primitive has a non-opaque object type, the system comprising:
- a depth testing module configured to apply depth testing to fragments of the primitive;
- a texturing module configured to apply texturing to fragments of the primitive; and
- an opacity testing module arranged to operate on fragments of the primitive prior to depth testing of the fragments by the depth testing module and prior to texturing of the fragments by the texturing module, the opacity testing module being configured to:
  (i) obtain an opacity state map which provides indications of the opacity of texels of a texture that is to be applied to the primitive; and
  (ii) for each of a plurality of blocks of one or more fragments of the primitive, use the opacity state map to determine a respective opacity state for the fragment block by: (a) determining the position of a block of opacity states within the opacity state map for the fragment block based on the texture co-ordinates of one or more fragments of the fragment block, and (b) determining the opacity state for the fragment block based on a predefined combination of the opacity states of the opacity state block;
wherein the depth testing module and the texturing module are configured to process fragments of the fragment blocks in accordance with the respective determined opacity states of the fragment blocks.

23. A non-transitory computer readable storage medium having stored thereon processor executable instructions that when executed cause at least one processor to process a primitive, which has a non-opaque object type, by:
  receiving fragments of the primitive to be processed, the received fragments of the primitive being associated with said non-opaque object type;
  prior to applying texturing to received fragments of the primitive:
    (i) obtaining an opacity state map which provides indications of the opacity of texels of a texture that is to be applied to the primitive;
    (ii) for each of a plurality of blocks of one or more fragments of the primitive, using the opacity state map to determine a respective opacity state for the fragment block by: (a) determining the position of a block of opacity states within the opacity state map for the fragment block based on the texture co-ordinates of one or more fragments of the fragment block, and (b) determining the opacity state for the fragment block based on a predefined combination of the opacity states of the opacity state block; and
    (iii) using the determined opacity states for the fragment blocks to perform one or more of: (a) based on the determined opacity states, indicating that the fragments of one or more of the fragment blocks are to be associated with a different object type to said non-opaque object type for subsequent processing of the fragments, (b) discarding one or more of the fragment blocks based on the determined opacity states, and (c) based on the determined opacity states, setting one or more flags to indicate that the fragments of one or more of the fragment blocks are not to be transmitted for subsequent texturing;
  applying depth testing to fragments of the primitive; and
  applying texturing to fragments of the primitive in accordance with their respective determined associated object types.

24. A non-transitory computer readable storage medium having stored thereon processor executable instructions that when executed at a computer system for generating a representation of a digital circuit from definitions of circuit elements and data defining rules for combining those circuit elements, cause the computer system to generate a 3D graphics processing system which is configured to process a primitive which has a non-opaque object type, wherein the system comprises:
  a depth testing module configured to apply depth testing to fragments of the primitive;
  a texturing module configured to apply texturing to fragments of the primitive in accordance with the object type associated with the fragments; and
  an opacity testing module arranged to operate on fragments of the primitive prior to texturing of the fragments by the texturing module, the opacity testing module being configured to:
    (i) obtain an opacity state map which provides indications of the opacity of texels of a texture that is to be applied to the primitive;
    (ii) for each of a plurality of blocks of one or more fragments of the primitive, use the opacity state map to determine a respective opacity state for the fragment block by: (a) determining the position of a block of opacity states within the opacity state map for the fragment block based on the texture co-ordinates of one or more fragments of the fragment block, and (b) determining the opacity state for the fragment block based on a predefined combination of the opacity states of the opacity state block; and
    (iii) use the determined opacity states for the fragment blocks to perform one or more of: (a) based on the determined opacity states, indicating that the fragments of one or more of the fragment blocks are to be associated with a different object type to said non-opaque object type for subsequent processing of the fragments, (b) discarding one or more of the fragment blocks based on the determined opacity states, and (c) based on the determined opacity states, setting one or more flags to indicate that the fragments of one or more of the fragment blocks are not to be transmitted to the texturing module for subsequent texturing;
  wherein the texturing module is configured to apply texturing to fragments of the primitive in accordance with their respective determined associated object types.

* * * * *